(12) United States Patent
Yoshimura et al.

(10) Patent No.: US 10,917,152 B2
(45) Date of Patent: Feb. 9, 2021

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/489,720

(22) PCT Filed: Feb. 27, 2018

(86) PCT No.: PCT/JP2018/007181
§ 371 (c)(1),
(2) Date: Aug. 29, 2019

(87) PCT Pub. No.: WO2018/159588
PCT Pub. Date: Sep. 7, 2018

(65) Prior Publication Data
US 2019/0386728 A1    Dec. 19, 2019

(30) Foreign Application Priority Data

Mar. 2, 2017 (JP) .................. 2017-039409

(51) Int. Cl.
*H04B 7/06* (2006.01)
*H04W 72/04* (2009.01)

(52) U.S. Cl.
CPC ........ *H04B 7/0617* (2013.01); *H04W 72/046* (2013.01)

(58) Field of Classification Search
None
See application file for complete search history.

(56) References Cited

U.S. PATENT DOCUMENTS

| 2017/0006589 | A1* | 1/2017 | Park | H04W 72/005 |
| 2017/0202014 | A1* | 7/2017 | Moon | H04L 47/824 |
| 2017/0331670 | A1* | 11/2017 | Parkvall | H04W 24/10 |
| 2018/0220400 | A1* | 8/2018 | Nogami | H04L 5/0078 |

(Continued)

OTHER PUBLICATIONS

Official Communication issued in International Patent Application No. PCT/JP2018/007181, dated May 22, 2018.

(Continued)

*Primary Examiner* — Syed Ali
(74) *Attorney, Agent, or Firm* — Imperium Patent Works

(57) ABSTRACT

This terminal apparatus is provided with: a receiver configured to receive at least a first physical signal and/or a second physical signal, wherein the first physical signal is generated during a first period, the first physical signal corresponds to a first beam during the first period, the second physical signal corresponds to the first beam in a case that the second physical signal is generated during the first period, and the second physical signal corresponds to a second beam in a case that the second physical signal is generated during a second period.

2 Claims, 10 Drawing Sheets

(56) References Cited

U.S. PATENT DOCUMENTS

2018/0323830 A1* 11/2018 Park ................... H04B 7/024
2019/0045488 A1*  2/2019 Park ................... H04L 5/0048
2019/0356449 A1* 11/2019 Yoshimura ........ H04W 72/1268

OTHER PUBLICATIONS

NTT Docomo, "New SID Proposal: Study on New Radio Access Technology", 3GPP TSG RAN Meeting #71, RP-160671, Mar. 7-10, 2016, 8 pages.
LG Electronics, "Discussion on QCL for NR", 3GPP TSG RAN WG1 Meeting #88, R1-1702466, Feb. 13-17, 2017, pp. 1-3.
Lenovo et al., "CSI-RS design for beam management", 3GPP TSG RAN WG1 Meeting #88, R1-1702664, Feb. 13-17, 2017, 5 pages.
Interdigital Communications, "On Beam Management for Control and Data Channels", 3GPP TSG-RAN WG1 #88, R1-1702324, Feb. 13-17, 2017, pp. 1-4.

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-039409 filed on Mar. 2, 2017, the contents of which are incorporated herein by reference.

BACKGROUND ART

A radio access method and a radio network for cellular mobile communications (hereinafter, referred to as "Long Term Evolution (LTE)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage a plurality of cells.

In 3GPP, a next-generation standard (New Radio (NR)) has been studied to make a proposal to International Mobile Telecommunication (IMT)-2020, a standard for a next-generation mobile communication system standardized by International Telecommunication Union (ITU) (NPL1). The NR is required, in a single technology framework, to meet a requirement assuming three scenarios of enhanced Mobile BroadBand (eMBB), massive Machine Type Communication (mMTC), and Ultra Reliable and Low Latency Communication (URLLC).

CITATION LIST

Non Patent Literature

Non Patent Literature 1: "New SID proposal: Study on New Radio Access Technology", RP-160671, NTT docomo, 3GPP TSG RAN Meeting #71, Goteborg, Sweden, 7-10 Mar. 2016.

SUMMARY OF INVENTION

Technical Problem

An aspect of the present invention provides a terminal apparatus capable of efficiently performing downlink reception, a communication method used for the terminal apparatus, a base station apparatus capable of efficiently performing downlink transmission, and a communication method used for the base station apparatus.

Solution to Problem (1) A first aspect of the present invention is a terminal apparatus including: a receiver configured to receive a first physical signal used to schedule a second physical signal, wherein a receive beam corresponding to the second physical signal is provided based on a timing at which the second physical signal is generated, and correspondence of the second physical signal to the receive beam corresponds to a QCL relationship between a first antenna port to which the second physical signal is mapped and an antenna port corresponding to the receive beam.

(2) A second aspect of the present invention is the above-described terminal apparatus, wherein in a case that the second physical signal is generated at a predetermined timing, the receive beam is provided based at least on downlink control information.

(3) A third aspect of the present invention is a base station apparatus including: a transmitter configured to transmit a first physical signal used to schedule a second physical signal, wherein a transmit beam corresponding to the second physical signal is provided based on a timing at which the second physical signal is generated, and correspondence of the second physical signal to the transmit beam corresponds to a QCL relationship between a first antenna port to which the second physical signal is mapped and an antenna port corresponding to the transmit beam.

(4) A fourth aspect of the present invention is the above-described base station apparatus, wherein in a case that the second physical signal is generated at a predetermined timing, the transmit beam is indicated based at least on downlink control information.

(5) A fifth aspect of the present invention is a communication method for a terminal apparatus, including the step of: receiving a first physical signal used to schedule a second physical signal, wherein a receive beam corresponding to the second physical signal is provided based on a timing at which the second physical signal is generated, and correspondence of the second physical signal to the receive beam corresponds to a QCL relationship between a first antenna port to which the second physical signal is mapped and an antenna port corresponding to the receive beam.

(6) A sixth aspect of the present invention is a communication method for a base station apparatus, including the step of: transmitting a first physical signal used to schedule a second physical signal, wherein a transmit beam corresponding to the second physical signal is provided based on a timing at which the second physical signal is generated, and correspondence of the second physical signal to the transmit beam corresponds to a QCL relationship between a first antenna port to which the second physical signal is mapped and an antenna port corresponding to the transmit beam.

Advantageous Effects of Invention

According to the present invention, the terminal apparatus can efficiently perform downlink reception. In addition, the base station apparatus can efficiently perform downlink transmission.

DESCRIPTION OF EMBODIMENTS

An embodiment of the present invention will be described below.

Figure 1:
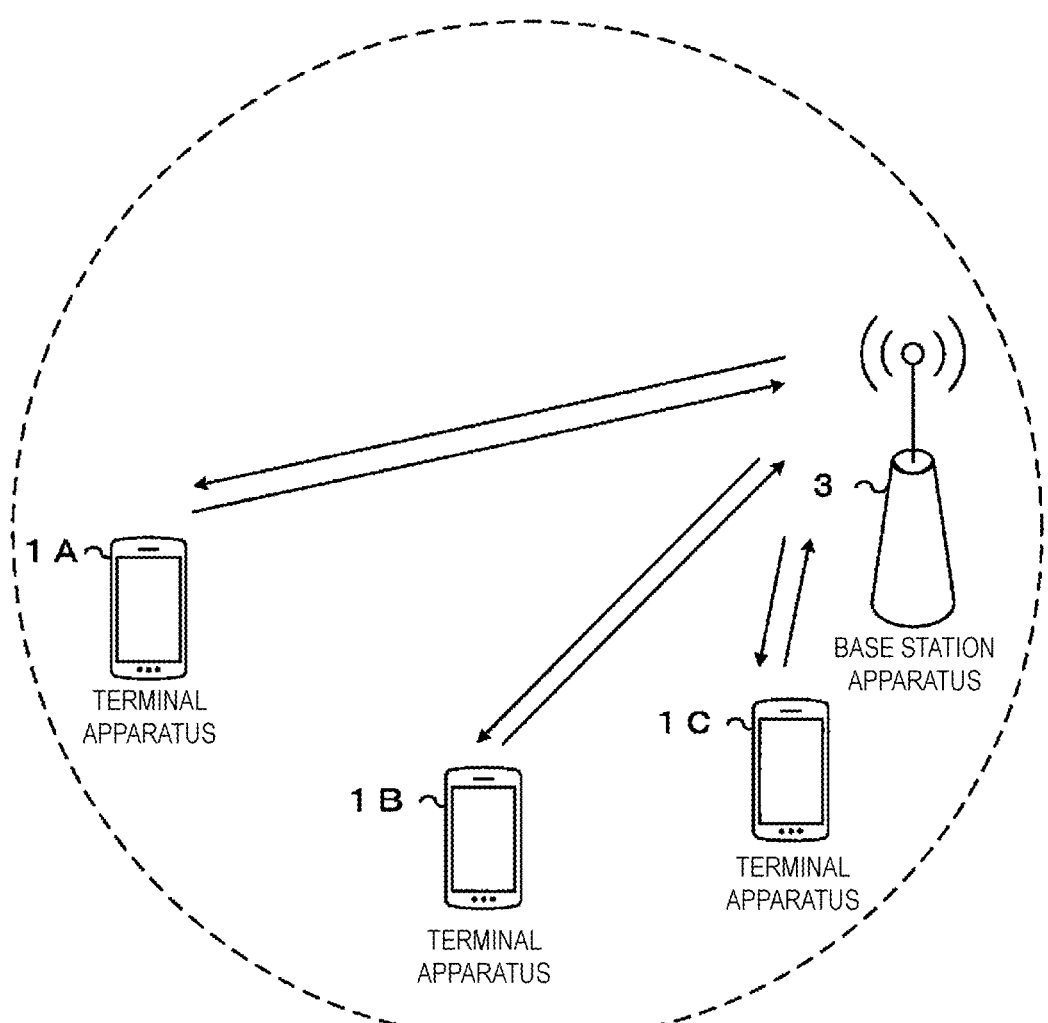
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, each of the terminal apparatuses 1A to 1C is also referred to as a terminal apparatus 1.

Hereinafter, various radio parameters relating to communication between the terminal apparatus 1 and the base station apparatus 3 will be described. Here, at least some of the radio parameters (e.g., Subcarrier Spacing (SCS)) are also referred to as Numerology. The radio parameters include at least some of the subcarrier spacing, a length of an OFDM symbol, a length of a subframe, a length of a slot, and a length of a mini-slot.

The subcarrier spacing may be classified into two kinds of a reference subcarrier spacing (Reference SCS, Reference Numerology) and a subcarrier spacing for a communication method used for actual radio communication (Actual SCS, Actual Numerology). The reference subcarrier spacing may be used to determine at least some of the radio parameters. For example, the reference subcarrier spacing is used to configure the length of the subframe. A method for determining the length of the subframe based on the reference subcarrier spacing will be described later. Here, the reference subcarrier spacing is 15 kHz, for example.

The subcarrier spacing used for the actual radio communication is one of the radio parameters for the communication method used for no communication between the terminal apparatus 1 and the base station apparatus 3 (e.g. Orthogonal Frequency Division Multiplex (OFDM), Orthogonal Frequency Division Multiple Access (OFDMA), Single Carrier-Frequency Division Multiple Access (SC-FDMA), Discrete Fourier Transform-spread-OFDM (DFT-s-OFDM)). Hereinafter, the reference subcarrier spacing is also referred to as a first subcarrier spacing. Additionally, the subcarrier spacing used for the actual radio communication is also referred to as a second subcarrier spacing.

Figure 2:
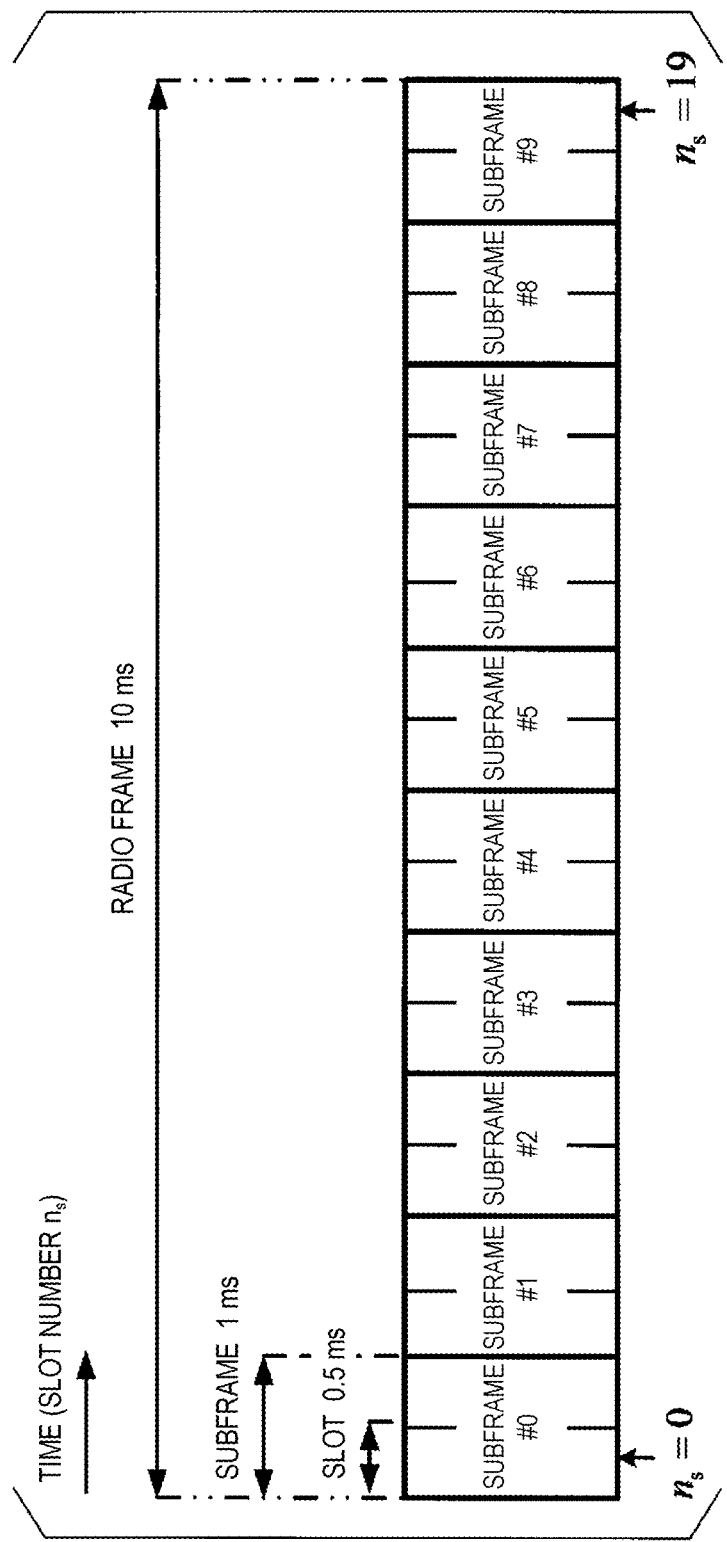
FIG. 2 is an example illustrating a configuration of a radio frame, a subframe, and a slot according to the aspect of the present embodiment.

FIG. 2 is an example illustrating a configuration of a radio frame, a subframe, and a slot according to the aspect of the present embodiment. In the example illustrated in FIG. 2, the length of the slot is 0.5 ms, the length of the subframe is 1 ms, and the length of the radio frame is 10 ms. The slot may be a unit of resource allocation in a time domain. For example, the slot may be a unit by which a transport block is mapped. For example, the transport block may be mapped to one slot. Here, the transport block may be a unit of data transmitted within a predetermined interval (e.g., Transmission Time Interval (TTI)) defined by a higher layer (e.g., Mediam Access Control (MAC). The transport block may be any one of a data block, transport data, transmission data, a transmission code, a transmission block, a payload, information, an information block, coded data, downlink data, and uplink data.

For example, the length of the slot may be given by the number of OFDM symbols. For example, the number of OFDM symbols may be 7 or 14. The length of the slot may be given at least based on the length of the OFDM symbol. The length of the OFDM symbol may vary at least based on the second subcarrier spacing. Furthermore, the length of the OFDM symbol may be given at least based on the number of points in Fast Fourier Transform (FFT) used to generate the OFDM symbol. Furthermore, the length of the OFDM symbol may include a length of a Cyclic Prefix (CP) added to the OFDM symbol. Here, the OFDM symbol may also be referred to as a symbol. Additionally, in a case that a communication method other than the OFDM is used in communication between the terminal apparatus 1 and the base station apparatus 3 (for example, a case that the SC-FDMA or the DFT-s-OFDM is used, or the like), an SC-FDMA symbol and/or a DFT-s-OFDM symbol to be generated is also referred to as the OFDM symbol. Here, for example, the length of the slot may be 0.25 ms, 0.5 ms, 1 ms, 2 ms, or 3 ms.

The length of the slot may be determined based on at least the subcarrier spacing and the type of CP added to the OFDM symbol. The subcarrier spacing may be determined based on at least the length of the slot and the type of CP added to the OFDM symbol.

Here, the OFDM includes a multi-carrier communication method to which a Pulse Shape, PAPR reduction, out-of-band radiation reduction, or filtering, and/or phase processing (e.g., phase rotation, etc.) is applied. Here, the multi-carrier communication method is, for example, the OFDM. Furthermore, the multi-carrier communication method may be a communication method for generating/transmitting a signal in which a plurality of subcarriers is multiplexed.

The length of the subframe may be 1 ms. Furthermore, the length of the subframe may be given based on the first subcarrier spacing. For example, in a case that the first subcarrier spacing is 15 kHz, the length of the subframe may be 1 ms. The subframe may include 1 or a plurality of slots.

The radio frame may be given by the number of subframes. The number of subframes for the radio frame may be, for example, 10.

Figure 3:
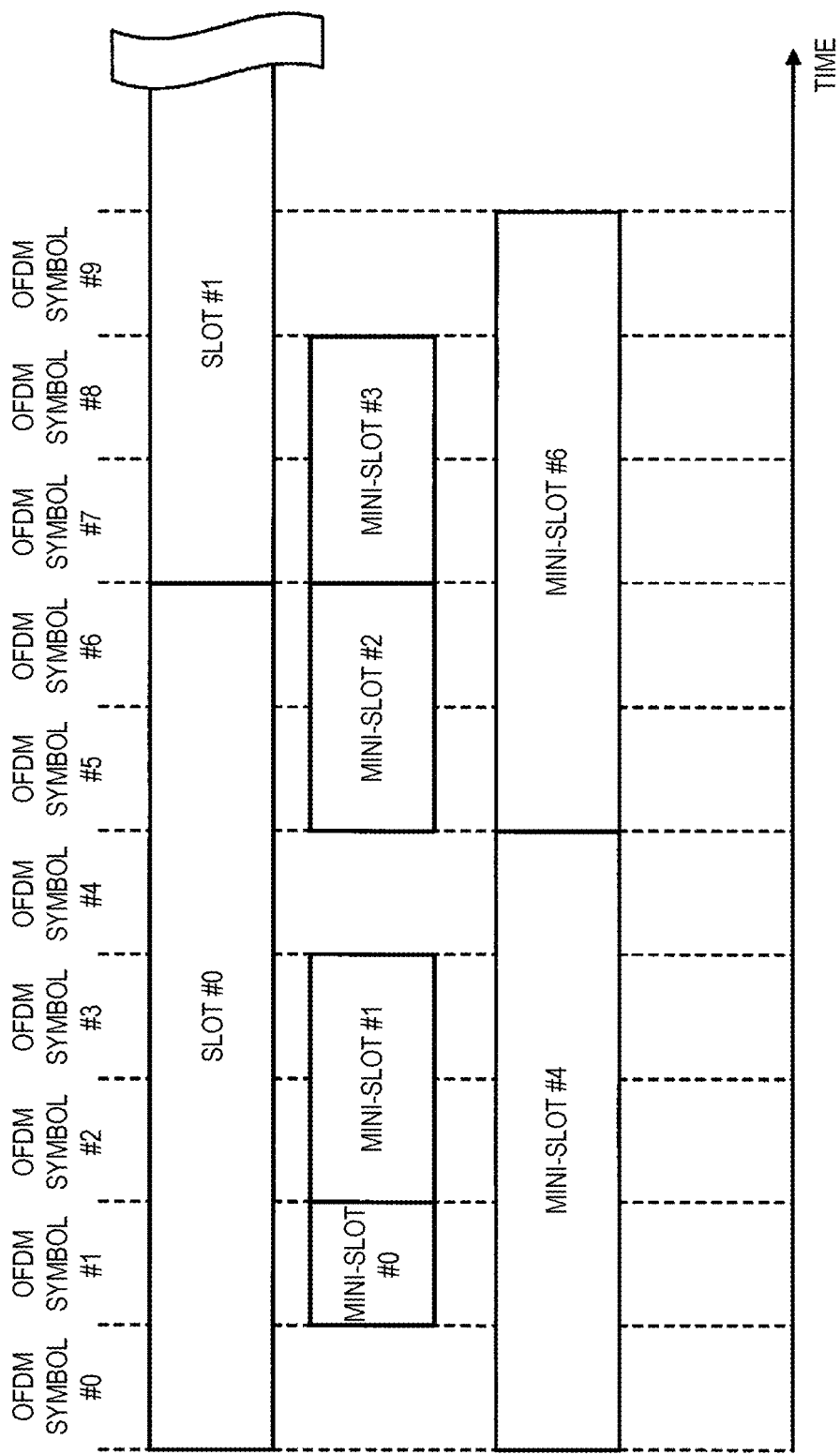
FIG. 3 is a diagram illustrating a configuration example of the slot and a mini-slot according to the aspect of the present embodiment.

FIG. 3 is a diagram illustrating a configuration example of the slot and a mini-slot according to the aspect of the present embodiment. In FIG. 3, seven OFDM symbols configure one slot. The mini-slot may include the smaller number of OFDM symbols than the number of OFDM symbols configuring the slot. Furthermore, the mini-slot may also be shorter in length than the slot. FIG. 3 illustrates a mini-slot #0 to a mini-slot #5 as an example of a mini-slot configuration. The mini-slot may be configured with one OFDM symbol, as illustrated by the mini-slot #0. Additionally, the mini-slot may also be configured with two OFDM symbols as illustrated by the mini-slots #1 through #3. Additionally, a gap may also be inserted between the two mini-slots, as illustrated by the mini-slot #1 and the mini-slot #2. Additionally, the mini-slot may also be configured across a boundary between a slot #0 and a slot #1, as illustrated by the mini-slot #5. That is, the mini-slot may be configured across the boundary of the slots. Here, the mini-slot is also referred to as a subslot. Additionally, the mini-slot is also referred to as a short Transmission Time Interval (short TTI (sTTI)). Additionally, in the following, the slot may be replaced by the mini-slot. The mini-slot may be configured by the same number of OFDM symbols as the slot. The mini-slot may include the larger number of OFDM symbols than the number of OFDM symbols configuring the slot. The length of the mini-slot in the time domain may be shorter than the slot. The length of the mini-slot in the time domain may be shorter than the subframe. The slot is also referred to as TTI.

An example of an initial connection procedure according to the present embodiment will be described below.

The base station apparatus 3 includes a communicable range (or a communication area) controlled by the base station apparatus 3. The communicable range can be divided into one or a plurality of cells (or serving cells, subcells, beams, etc.) to manage communication with the terminal apparatus 1 for each cell. On the other hand, the terminal apparatus 1 selects at least one cell from among a plurality of cells, and attempts to establish a connection with the base station apparatus 3. Here, a first state in which a connection between the terminal apparatus 1 and at least one cell of the base station apparatus 3 is established is also referred to as an RRC Connection. Here, RRC is Radio Resource Control. Additionally, a second state in which the terminal apparatus 1 does not establish a connection with any of the cells of the base station apparatus 3 is also referred to as RRC idle. In addition, a third state in which a connection between the terminal apparatus 1 and at least one cell of the base station apparatus 3 is established, but some functions are limited between the terminal apparatus 1 and the base station apparatus 3 is also referred to as RRC suspended. The RRC suspended is also referred to as an RRC inactive.

Figure 4:
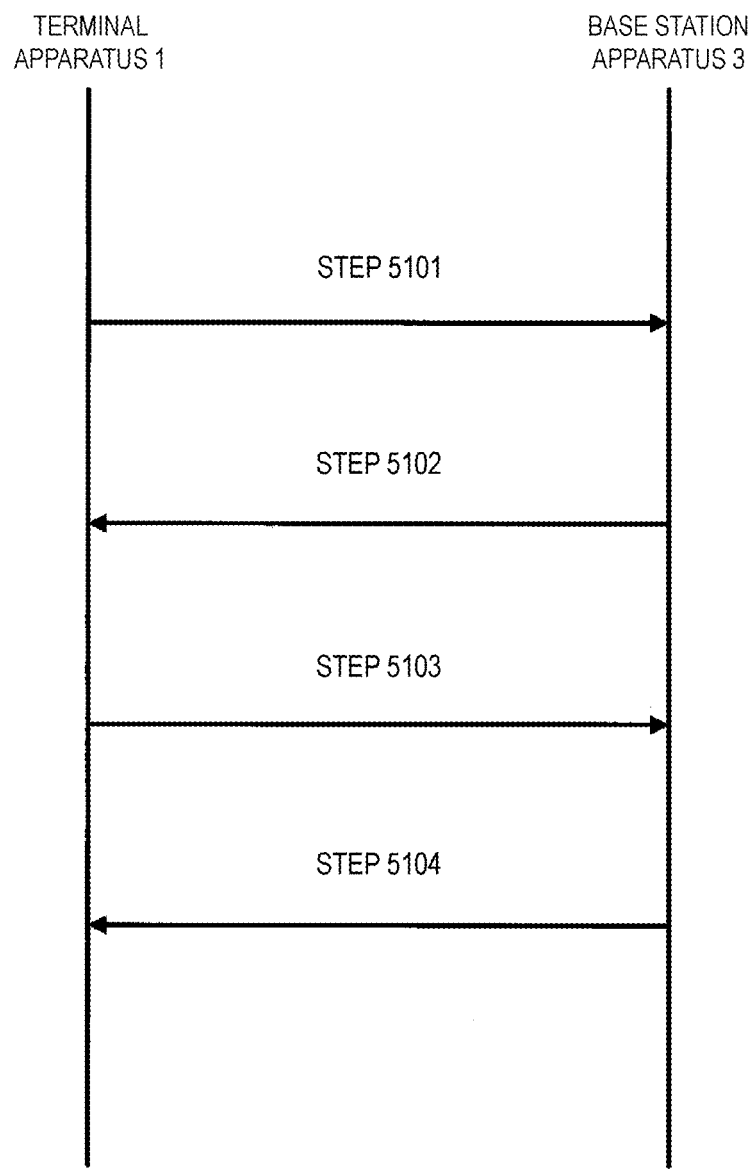
FIG. 4 is a diagram illustrating an example of a first initial connection procedure (4-step contention based RACH procedure) according to the aspect of the present embodiment.

The terminal apparatus 1 in the RRC idle may attempt to establish a connection with at least one cell (e.g., target cell) of the base station apparatus 3. FIG. 4 is a diagram illustrating an example of a first initial connection procedure (4-step contention based RACH procedure) according to the aspect of the present embodiment. The first initial connection procedure is configured to include at least some of steps 5101 to 5104.

Step 5101 is a step in which the terminal apparatus 1 makes a request to the target cell, via a physical channel, for a response for an initial connection. Alternatively, step 5101 is a step in which the terminal apparatus 1 performs a first transmission to the target cell via the physical channel. Here, the physical channel may be, for example, a Physical Random Access Channel (PRACH). The physical channel may be a channel at least used for requesting a response for the initial connection. Furthermore, the physical channel is also referred to as a random access channel. Here, an operation in which information is transmitted via the physical channel (or channel) is also referred to as the physical channel (or channel) being transmitted.

The PRACH may be used to transmit a random access preamble (random access message 1). The PRACH may be used to indicate an initial connection establishment procedure, a handover procedure, connection re-establishment procedure, synchronization (timing adjustment) for uplink transmission, and a request for the PUSCH (UL-SCH) resources.

The random access preamble may be given by cyclic shifting the Zadoff-Chu sequence corresponding to a physical root sequence index u. The Zadoff-Chu sequence is generated based on the physical root sequence index u. In one cell, a plurality of random access preambles may be defined. The random access preamble may be identified by an index of the random access preamble. A different random access preamble corresponding to a different index of a random access preamble corresponds to a different combination of physical root sequence index u and cyclic shift. A physical root sequence index u and a cyclic shift may be given based at least on information included in system information.

Before performing step 5101, the terminal apparatus 1 acquires information associated with a transmission method of the random access channel. For example, the information associated with the transmission method of the random access channel may be synchronization with the target cell, a transmission timing of the random access channel, a configuration of the random access channel, a configuration of a bit sequence transmitted via the random access channel, or the like. For example, the terminal apparatus 1 may receive a Synchronization Signal (SS) transmitted by the base station apparatus 3 in order to synchronize with the downlink of the target cell. The synchronization includes at least one of synchronization of the time domain and synchronization of a frequency domain.

The synchronization signal may include a Primary Synchronization Signal (PSS) and/or a Secondary Synchronization Signal (SSS).

The synchronization signal may be transmitted including an ID (cell ID) of the target cell. Alternatively, the synchronization signal may be transmitted including a sequence generated at least based on the cell ID. The cell ID may be used at least to identify the cell. The synchronization signal may be transmitted while the transmit beam being applied thereto.

The synchronization signal may be transmitted including an index of the beam (beam index) applied to the synchronization signal. The beam index may be included in the cell ID. The beam index may be derived from the cell ID. Additionally, the synchronization signal may also be transmitted including a sequence generated at least based on the index of the beam applied to the synchronization signal. Here, the beam index may be associated with an index of a time and/or a frequency at which the synchronization signal is transmitted. The beam index may be associated with an index of the OFDM symbol in which the synchronization signal is transmitted. The beam index may be associated with an index of a slot in which the synchronization signal is transmitted. The beam index may be associated with an index of a subframe in which the synchronization signal is transmitted. The beam index may be an index for identifying a predetermined synchronization signal. For example, the synchronization signal may be transmitted at a plurality of times within a predetermined period (e.g., the slot, the subframe, etc.). The beam index may be used to identify the synchronization signals transmitted in the predetermined period. The beam index may be an index to indicate the location of the synchronization signal transmitted in the predetermined period.

The terminal apparatus 1 may receive a broadcast channel (for example, Physical Broadcast CHannel (PBCH)) transmitted from the target cell. The broadcast channel may be transmitted including an essential information block, such as a Master Information Block (MIB) and an Essential Information Block (EIB), which includes essential system information needed by the terminal apparatus 1. Here, the essential information block may be part of the system information. The essential information block may include a number of the radio frame. Additionally, the essential information block may include information about a position within a superframe including a plurality of radio frames (for example, information for indicating at least some of System Frame Numbers (SFNs) in the superframe). Additionally, the broadcast channel may include the beam index. The broadcast channel may include at least some of the information associated with the transmission method of the random access channel. The MIB may be information commonly used in the cell. The MIB may be information commonly used for a group of terminal apparatuses 1 that detect synchronization signals associated with the MIB.

The MIB is mapped to a Broadcast Control Channel (BCCH) in a higher layer channel (logical channel). The MIB is mapped to the broadcast channel in a channel of the physical layer (Physical channel).

Here, the higher layer channel is defined by a type of information to be transmitted. For example, the BCCH is the higher layer channel that is used to transmit Broadcasting system control information. Here, the broadcasting system control information is, for example, the MIB. Additionally, a Common Control CHannel (CCCH) is the higher layer channel used to transmit common information among the plurality of terminal apparatuses 1. Here, the CCCH is used for the terminal apparatus 1 that is not in the RRC connection, for example. Additionally, a Dedicated Control CHannel (DCCH) is the higher layer channel used to transmit dedicated control information to the terminal apparatus 1. Here, the DCCH is used for the terminal apparatus 1 in the RRC connection, for example.

Here, the channel of the physical layer includes at least some or all of the broadcast channel, the random access channel, the control channel, and a shared channel.

The terminal apparatus 1 may receive at least part of the system information based on at least the information included in the broadcast channel. At least a portion of the system information may be included in a shared channel indicated by a downlink grant included in the control channel for the first initial connection. At least a portion of the system information may be included in a shared channel indicated by information included in the PBCH.

The system information may include at least information for the terminal apparatus 1 to access the cell. The system information may include at least radio resource configuration information that is common to the plurality of terminal apparatuses 1. Here, the radio resource configuration information may be information related to the configuration of the radio resource for the downlink. Additionally, the radio resource configuration information may be radio resource configuration information for the uplink. Here, the radio resource configuration information for the uplink may include at least a portion of information associated with the transmission method of the random access channel. Additionally, the radio resource configuration information for the uplink may include information for the resource configuration of the random access channel. Additionally, the system information may also include at least resource allocation information of at least some system information.

The resource allocation of the system information may be configured for each block (System Information Block (SIB)) that includes at least a portion of the system information. By the base station apparatus 3, the SIB may be broadcast in one cell or may be transmitted dedicatedly to the terminal apparatus 1.

A System Information Block Type 1 (SIB1) includes at least information for the terminal apparatus 1 to access the cell (plmnIdentityList, for example). The SIB1 is transmitted on the shared channel indicated by the downlink grant included in the control channel for the first initial connection.

On the other hand, the SIB1 is mapped to the BCCH. The SIB1 is information broadcast in one cell.

A System Information Block Type 2 (SIB2) includes at least the parameter of the physical layer. Here, the parameter of the physical layer is, for example, information associated with the transmission method of the random access channel. The SIB2 is transmitted on the shared channel indicated by the downlink grant included in the control channel for the initial connection.

On the other hand, the SIB2 is mapped to the BCCH. The SIB2 is information broadcast in one cell.

Step 5102 may include an operation of the terminal apparatus 1 monitoring a predetermined physical channel for at least a predetermined period. For example, the predetermined physical channel may be a Control Channel. The control channel may be, for example, a Physical Downlink Control CHannel (PDCCH). The control channel may be transmitted, for example, including at least a portion of the Downlink Control Information (DCI). Here, the downlink control information may include resource allocation information of the downlink. The resource allocation information of the downlink is also referred to as a Downlink Grant (DL Grant). Additionally, the downlink control information may include resource allocation information of the uplink. The resource allocation information of the uplink is also referred to as an Uplink Grant (UL Grant). Additionally, the downlink control information may include information to be used for a group of terminal apparatuses including the terminal apparatus 1. Additionally, the downlink control information may include information broadcast at a predetermined cell. The downlink control information may include at least information indicating a region (Control resource set, Control Channel Region (Control Region)) to which the control channel may be mapped. Here, the information indicating the region to which the control channel may be mapped may be the number of OFDM symbols included in the region to which the control channel may be mapped. That is, the information indicating the region to which the control channel may be mapped may include information about the time domain. The control resource set is also referred to as a channel set. A configuration of the control channel and details of the control channel will be described later. The terminal apparatus 1 can monitor the control channel by being provided with the information indicating the region to which the control channel may be mapped. The downlink grant and the uplink grant are also referred to as a grant.

Here, the information indicating the region to which the control channel may be mapped may be mapped to the BCCH. Furthermore, the information indicating the region to which the control channel may be mapped may be mapped to the CCCH. Furthermore, the information indicating the region to which the control channel may be mapped may be mapped to the DCCH.

For example, in step 5102, a control channel including predetermined downlink control information may be received. The predetermined downlink control information may include the uplink grant. Additionally, the predetermined downlink control information may include the downlink grant. The downlink grant may be resource allocation information of the shared channel (or data channel). Here, the shared channel is also referred to as a Physical Shared CHannel (PSCH). Here, the shared channel may include at least one of a Physical Downlink Shared Channel and a Physical Uplink Shared Channel. The physical downlink shared channel may be a downlink shared channel. The physical uplink shared channel may be an uplink shared channel.

In a case that the control channel including the downlink grant is received in step 5102, the shared channel indicated by the downlink grant may include the uplink grant. The uplink grant is also referred to as a random access response grant. The uplink grant may be resource allocation information for the shared channel including a first message transmitted by the terminal apparatus 1 in step 5103. On the other hand, the uplink grant may include resource allocation information of the physical uplink shared channel.

Here, the control channel monitored in step 5102 by the terminal apparatus 1 is also referred to as a control channel for the first initial connection. The control channel for the first initial connection may include a CRC sequence masked based on a sequence (e.g., Radio Network Temporary Identifier (RNTI), Random Access-RNTI (RA-RNTI)) used for the first initial connection. That is, the terminal apparatus 1 may use the RA-RNTI in the monitor of the control channel for the first initial connection.

The control channel for the first initial connection procedure may be a control channel common to the terminal apparatuses 1 in the cell. Alternatively, the control channel for the first initial connection procedure may be a control channel common to the group of the terminal apparatuses 1. For example, information, which is mapped to the BCCH or the CCCH, indicating the region to which the control channel may be mapped may indicate a region to which the control channel common to the terminal apparatuses in the cell and/or the group of the terminal apparatuses 1 may be mapped. Furthermore, at least some of the control channels other than the control channel for the first initial connection procedure may be a control channel specific to the terminal apparatus 1. For example, information, mapped to the DCCH, for indicating the region to which the control channel may be mapped may indicate a region to which at least some of the control channels other than the control channel for the first initial connection procedure may be mapped.

Step 5103 may include an operation of transmitting a physical uplink shared channel including the first message to be used for the terminal apparatus 1 to make a request to a target cell for a connection. The first message may be used for the terminal apparatus 1 to make the request to the target cell for the connection in the first initial connection procedure.

Step 5104 may include an operation of monitoring (or expecting to receive) a second message that is a response to the first message. The second message may be a message indicating that the first message has been properly received by the base station apparatus 3. The second message may be a message indicating that no Contention has occurred with other terminal apparatuses in the first initial connection procedure. The second message may be transmitted for a Contention resolution. The second message is also referred to as a contention resolution message. The second message may include a terminal apparatus-specific ID. The ID may be a System Architecture Evolution (SAE)-Temporary Mobile Subscriber Identity (S-TMSI), for example.

Figure 5:
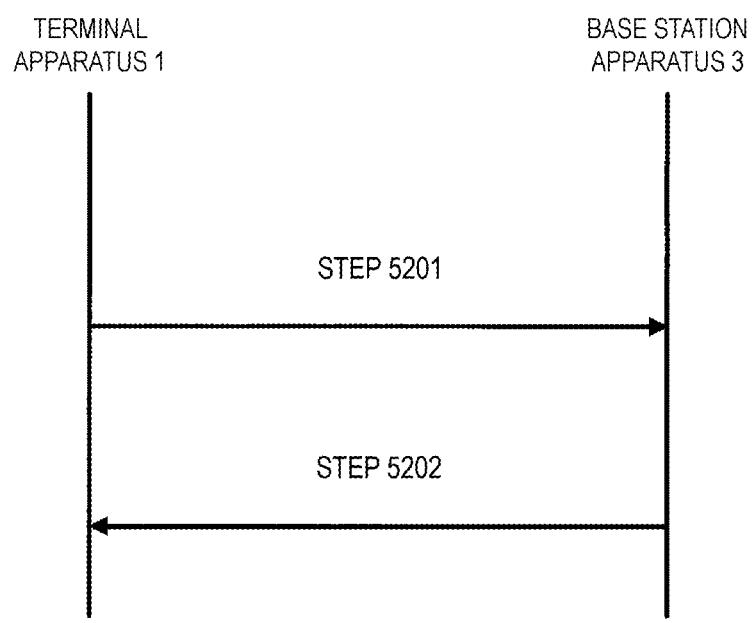
FIG. 5 is a diagram illustrating an example of a second initial connection procedure (2-step contention based RACH procedure) according to the aspect of the present embodiment.

FIG. 5 is a diagram illustrating an example of a second initial connection procedure (2-step contention based RACH procedure) according to the aspect of the present embodiment. The second initial connection procedure may be configured to include at least some of steps 5201 and 5202.

Step 5201 includes a step of transmitting the random access channel and/or the uplink shared channel. The terminal apparatus 1 may transmit the random access channel including information indicating the resource of the uplink shared channel and the uplink shared channel. The uplink shared channel may include the first message. Here, in step 5201, the control channel may be transmitted by the terminal apparatus 1 instead of the random access channel. The control channel may be an uplink control channel (Physical Uplink Control CHannel (PUCCH)). The terminal apparatus 1 may transmit the uplink control channel including information indicating the resource of the uplink shared channel and the uplink shared channel.

The uplink control channel may include information indicating whether or not decoding of the transport block has been successfully completed (Acknowledgement (ACK), Hybrid Automatic Request-ACK (HARQ-ACK)). Additionally, the uplink control channel may be transmitted including Channel State Information (CSI) estimated based on the reference signal and the synchronization signal. Furthermore, the uplink control channel may include Scheduling Request (SR).

A downlink control channel may include information associated with a Start symbol indicating a start of the downlink shared channel. Information associated with the start symbol may be used for the downlink shared channel allocated based on the downlink control channel.

The start symbol may be given based on at least the downlink control channel. For example, the start symbol may be given based on an index for the OFDM symbol to which the downlink control channel is mapped. For example, in a case that the index for the OFDM symbol to which the downlink control channel is mapped is $X_{start}$, the start symbol may be $X_{start}+2$, may be $X_{start}+1$, or may be $X_{start}$. Furthermore, in a case that the downlink control channel is mapped to a plurality of OFDM symbols, $X_{start}$ may be an index for the leading OFDM symbol to which the downlink control channel is mapped, or may be an index for the last OFDM symbol to which the downlink control channel is mapped.

Step 5202 includes an operation of monitoring a predetermined downlink control channel. The control channel is also referred to as a control channel for the second initial connection. The control channel for the second initial connection may include a random access response grant. Additionally, the control channel for the second initial connection may also be used to resolve the contention. Additionally, the control channel for the second initial connection may also include the second message. Additionally, the control channel for the second initial connection may include a terminal apparatus-specific ID.

The first initial connection procedure may be used in a case that the terminal apparatus 1 is in the RRC idle. The second initial connection procedure may be used in the case that the terminal apparatus 1 is in the RRC idle. The first initial connection procedure may be used in a case that the terminal apparatus 1 is in the RRC suspended. The second initial connection procedure may be used in the case that the terminal apparatus 1 is in the RRC suspended. In addition, the first initial connection procedure may be used at least in the case that the terminal apparatus 1 is in the RRC idle, and the second initial connection procedure may be used in the case that the terminal apparatus 1 is in the RRC suspended.

A unit of the physical resource according to the present embodiment will be described below.

Figure 6:
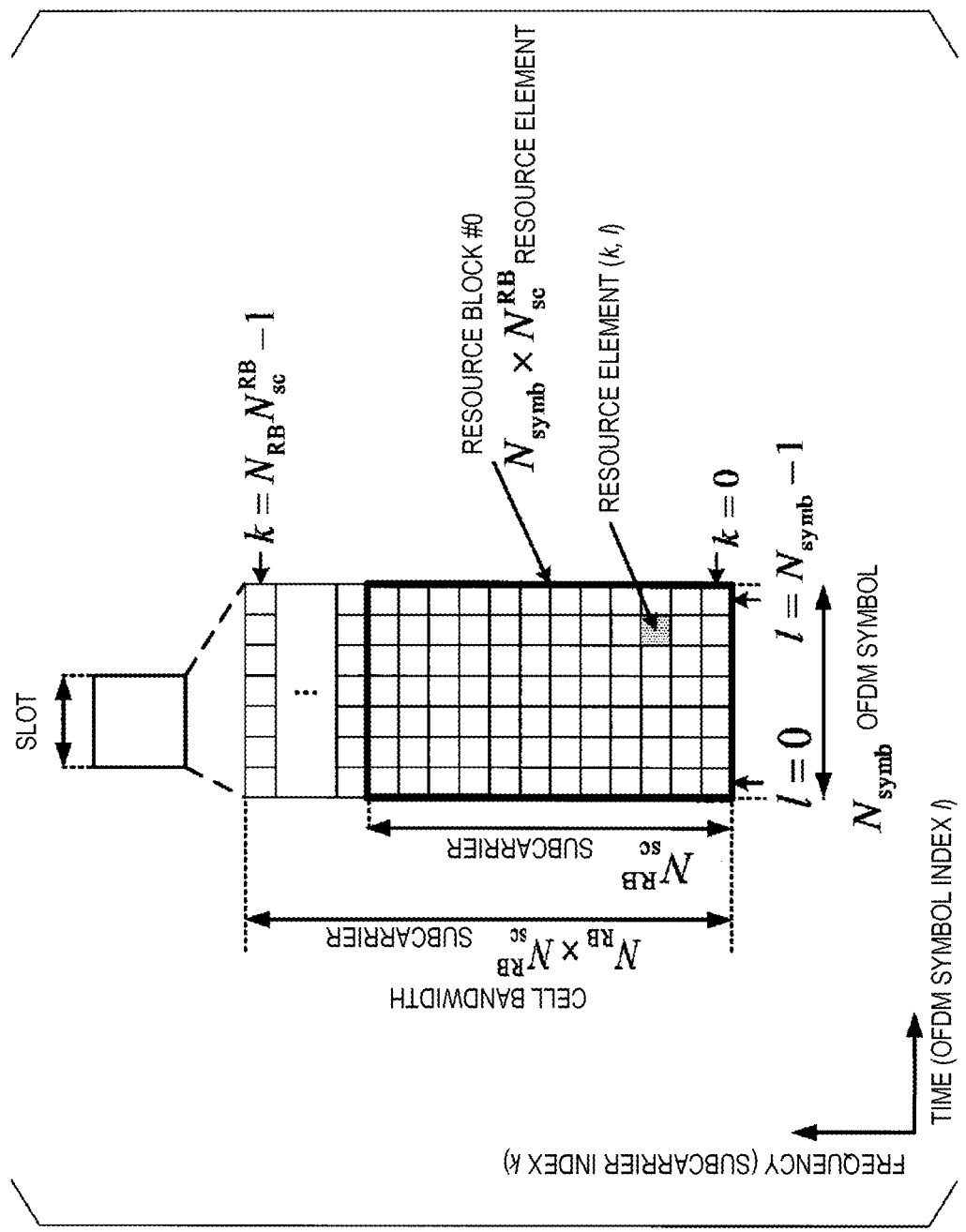
FIG. 6 is a diagram illustrating an example of a resource element included in the slot according to the aspect of the present embodiment.

FIG. 6 is a diagram illustrating an example of a resource element included in the slot according to the aspect of the present embodiment. Here, the Resource Element (RE) is a unit defined by one OFDM symbol and one subcarrier. As illustrated in FIG. 6, the slot includes $N_{symb}$ OFDM symbols. Additionally, the number of subcarriers may be given by the product of the number $N_{RB}$ of resource blocks and the number $N^{RB}_{SC}$ of subcarriers per one resource block. Here, the resource block indicates a group of resource elements in the time/frequency domain. The resource block may be used as a unit of resource allocation for the time domain and/or the frequency domain. For example, $N^{RB}_{SC}$ may be 12. $N_{symb}$ may be the same as the number of OFDM symbols included in the subframe. $N_{symb}$ may be the same as the number of OFDM symbols included in the slot. $N_{RB}$ may be given based on a bandwidth of the cell and the first subcarrier spacing. Additionally, $N_{RB}$ may be given based on the bandwidth of the cell and the second subcarrier spacing. Additionally, $N_{RB}$ may be given based on higher layer signaling (e.g., RRC signaling) or the like transmitted from the base station apparatus 3. Additionally, the $N_{RB}$ may be given based on descriptions of a specification or the like. The resource element is identified by an index k for the subcarrier and an index 1 for the OFDM symbol.

Here, the RRC signaling includes at least common RRC signaling and dedicated RRC signaling. The common RRC signaling is signaling for transmitting information mapped to the CCCH. Additionally, the dedicated RRC signaling is signaling for transmitting information mapped to the DCCH.

Mapping of the control channel will be described below.

The control resource set may be a set of control channels (or control channel candidates) to be monitored by the terminal apparatus 1. The control resource set may include the set of control channels (or control channel candidates) to be monitored by the terminal apparatus 1.

Here, the control resource set including the control channel for the first initial connection is also referred to as a first control resource set. The first control resource set may be a control resource set common to the terminal apparatuses in the cell. A set of control channels (or control channel candidates) included in the first control resource set and monitored by the terminal apparatus 1 is also referred to as a Common Search Space (CSS).

Information indicating a region of the first control resource set may be mapped to the BCCH. The information indicating the region of the first control resource set may be given at least based on information broadcast by the MIB and/or the SIB. The information indicating the region of the first control resource set may be information used for configuring the number of OFDM symbols included in the first control resource set. The number of OFDM symbols included in the first control resource set may be commonly configured in one cell or a plurality of cells. The number of OFDM symbols included in the first control resource set may be given at least based on information broadcast by the MIB and/or the SIB.

Information indicating a region of the CSS may be mapped to the BCCH. For example, the information indicating the region of the CSS may be information used for configuring the number of OFDM symbols constituting the CSS. The number of OFDM symbols constituting the CSS may be commonly configured in one cell or a plurality of cells. The number of OFDM symbols constituting the CSS may be given at least based on information broadcast by the MIB and/or the SIB.

Additionally, the control resource set including the control channel for the second initial connection is also referred to as a second control resource set. The second control resource set may be a control resource set common to the terminal apparatuses in the cell. A set of control channels (or control channel candidates) included in the second control resource set and monitored by the terminal apparatus 1 is also referred to as the CSS.

Additionally, the control resource set, which is specifically configured for the terminal apparatus 1, is also referred to as a third control resource set. The third control resource set may not include the first control resource set. The third control resource set may not include the second control resource set. The third control resource set may include the first control resource set. The third control resource set may include the second control resource set. A set of control channels (or control channel candidates) included in the third control resource set and monitored by the terminal apparatus 1 is also referred to as a UE specific-Search Space (USS).

Information indicating a region of the third control resource set may be mapped to the DCCH. The information indicating the region of the third control resource set may be given at least based on the dedicated RRC signaling. For example, the information indicating the region of the third control resource set may be information used for configuring the number of OFDM symbols included in the third control resource set. The number of OFDM symbols included in the third control resource set may be at least given based on the dedicated RRC signaling.

Information indicating a region of the USS may be mapped to the DCCH. The information indicating the region of the USS may be given at least based on the dedicated RRC signaling. For example, the information indicating the region of the USS may be given at least based on the dedicated RRC signaling.

A corresponding relationship between the beams of the terminal apparatus 1 and the base station apparatus 3 will be described below. Here, the beam indicates a receive beam and/or a transmit beam. In the following, a description is given of downlink radio communication as an example, but various aspects of the present embodiment are also preferable for uplink radio communication.

Figure 7:
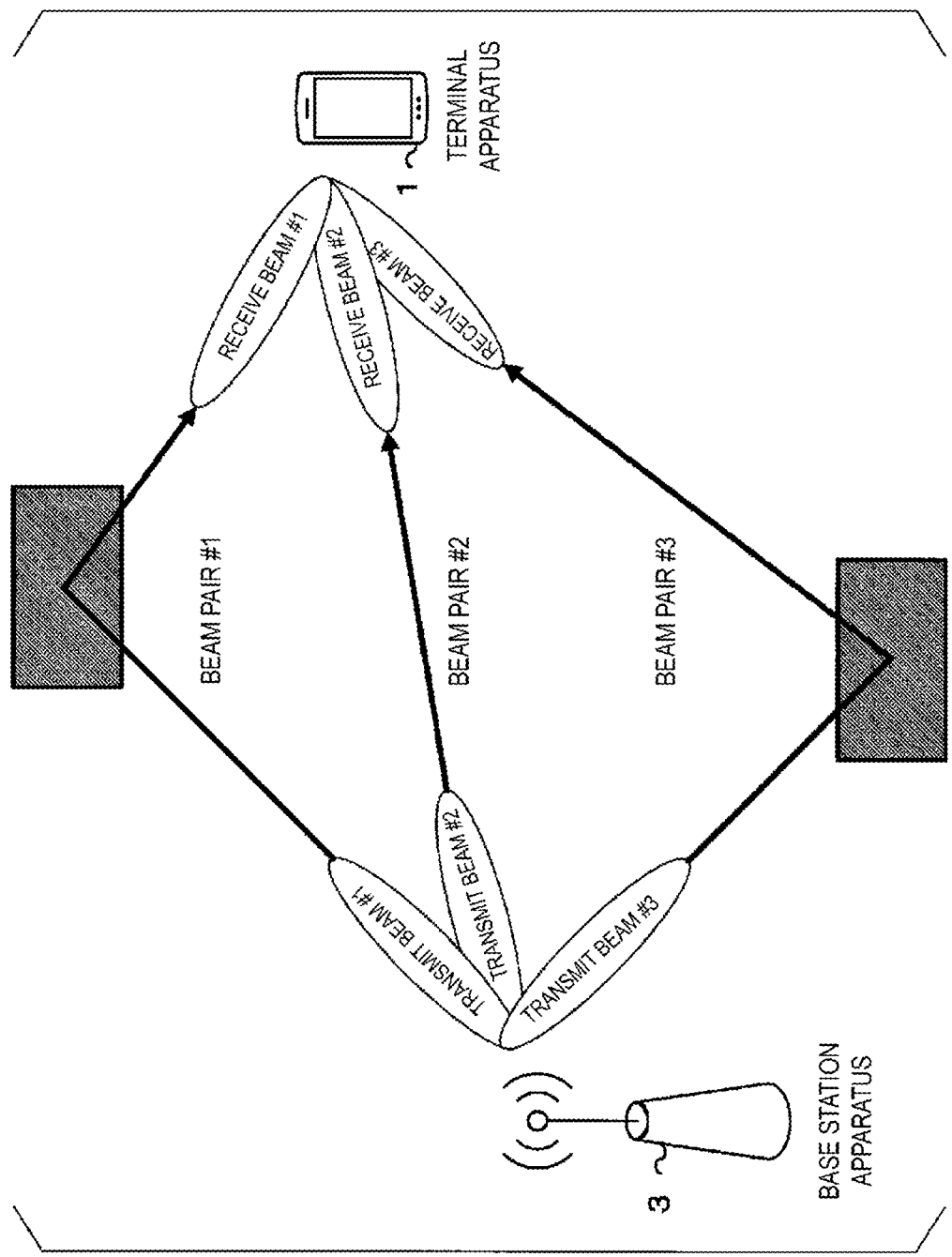
FIG. 7 is a diagram illustrating an example of a correspondence relationship between beams of a terminal apparatus 1 and a base station apparatus 3 in a downlink transmission according to the aspect of the present embodiment.

FIG. 7 is a diagram illustrating an example of a correspondence relationship between beams of the terminal apparatus 1 and the base station apparatus 3 in a downlink transmission according to the aspect of the present embodiment. In FIG. 7, the terminal apparatus 1 includes three receive beams (receive beam #1, receive beam #2, receive beam #3), and the base station apparatus 3 includes three transmit beams (transmit beam #1, transmit beam #2, transmit beam #3). Here, areas indicated by the diagonal lines schematically illustrates a phenomenon in which the carrier wave signal bends due to reflection, scattering, diffraction, refraction, and the like.

Here, a predetermined radiation pattern may be given to the physical signal by the application of the transmit beam. The transmit beam may exhibit a phenomenon in which gain varies depending on a direction. The transmit beam may be given based at least on the directivity of the antenna used for the physical signal to be emitted towards the radio space (channel, radio section). The transmit beam may also be given based at least on the phase transformation processing of the Carrier signal provided by the transformation of the physical signal. The transmit beam may also be given at least based on the phase transformation processing (or precoder multiplexing) of the physical signal. Here, the physical signal includes at least some or all of a synchronization signal, a reference signal, and a channel of a physical layer.

Here, the physical signal transmitted by the base station apparatus 3 may be received in a predetermined reception pattern by the receive beam being applied at the terminal apparatus 1. The receive beam may exhibit a phenomenon in which gain varies depending on a direction. The receive beam may be given based at least on the directivity of the antenna used for the physical signal to be received via the radio space. The receive beam may also be given based at least on the phase transformation processing of the received Carrier signal. The receive beam may also be given at least based on the phase transformation processing (or precoder multiplexing) of the physical signal given by transformation of the carrier signal.

In FIG. 7, transmit beam #1 and receive beam #1 form beam pair #1. Transmit beam #2 and receive beam #2 form beam pair #2. Transmit beam #3 and receive beam #3 form beam pair #3. The beam pair is provided by a pair of a transmit beam and a receive beam. Forming beam pairs can achieve optimal reception characteristics. Here, the optimal reception characteristics may be characteristics capable of demodulating and decoding the received physical signal. The beam pair may be formed only with transmit beams or only receive beams in a case that the optimal reception characteristic is obtained. Note that the beam widths (e.g., 3 dB beam width) of a transmit beam and a receive beam forming a beam pair may not be the same width. It is preferable that the beam pair be given so that the terminal apparatus 1 and the base station apparatus 3 can perform the downlink transmission suitably. For example, in a case that a predetermined transmit beam is applied to the physical signal transmitted from the base station apparatus 3, and that it is preferable that a predetermined receive beam be applied for reception of the physical signal, it is preferable that the predetermined transmit beam and the predetermined receive beam form a beam pair. Here, the predetermined receive beam forming a beam pair with the predetermined transmit beam may be the receive beam of best reception characteristics under conditions where the predetermined transmit beam is applied. Alternatively, the predetermined receive beam forming a beam pair with the predetermined transmit beam may be one of the receive beams of best reception characteristics under conditions where the predetermined transmit beam is applied.

As illustrated in FIG. 7, it is desirable that a plurality of beam pairs be configured in the terminal apparatus 1 and the base station apparatus 3. For example, even in a case that beam pair #2 is unable to use as the terminal apparatus 1 moves, communication can be performed using beam pair #1 and/or beam pair #3.

The plurality of beam pairs may constitute a group of beam pairs. Unless otherwise noted, the beam pair may be a group of beam pairs. The beam pair may include one or a plurality of transmit beams and one or a plurality of receive beams.

The application of the predetermined beam to the physical signal may also be referred to as a given beam corresponding to the physical signal.

The correspondence relationship between the physical signal and the receive beam will be described below.

The physical signal corresponding to the receive beam may be the predetermined antenna port corresponding to the physical signal. Here, the predetermined antenna port may correspond to a transmit beam that forms a beam pair with the receive beam. That is, the physical signal corresponding to the receive beam may be that the antenna port corresponding to the predetermined transmit beam corresponds to the physical signal. The receive beam corresponding to the physical signal may be an antenna port to which the physical signal corresponds. The antenna port may be an antenna port corresponding to a transmit beam that forms a beam pair with the receive beam.

Here, an antenna port is defined as one in which a channel conveyed by a certain symbol of a certain antenna port can be estimated from a channel conveyed by another symbol of the same antenna port. That is, for example, in a case that a first physical channel and a first reference signal are conveyed by symbols of the same antenna port, channel compensation of the first physical channel can be performed by the first reference signal. Here, the same antenna port may be that antenna port numbers (numbers for identifying the antenna ports) are the same. Here, the symbol may be, for example, at least part of the OFDM symbol. Additionally, the symbol may be the resource element.

The physical signal corresponding to the receive beam may be the predetermined transmit beam corresponding to the physical signal. That is, the receive beam corresponding to the physical signal may indicate whether a predetermined transmit beam corresponds to the physical signal. Here, the predetermined transmit beam may form a beam pair with the receive beam.

The physical signal corresponding to the receive beam may be a predetermined beam pair corresponding to the physical signal. The predetermined beam pair may include the receive beam. That is, the receive beam corresponding to the physical signal may be a beam pair that includes the received beam.

The physical signal corresponding to the receive beam may be that the first antenna port corresponding to the physical signal and the second antenna port are Quasi Co-Location (QCL). Here, the first antenna port and the second antenna port being QCL may be that at least a portion of the nature of the channel on which a symbol of the first antenna port carries can be estimated from the channel on which other symbols of the second antenna port carry. The nature of the channel may include at least some or all of a beam, reception power (reception power value, reception power density, reception strength, etc.), transmit power (transmit power value, transmit power density, transmission strength, etc.), Timing advance (TA), Angle of Arival (AoA), Doppler shift, delay spread (or maximum delay time, etc.), and delay extension (delay expansion, instantaneous delay extension, instantaneous delay expansion, etc.). Here, the second antenna port may be an antenna port corresponding to Channel State Information-Reference Signal (CSI-RS) corresponding to the receive beam. The second antenna port may also be an antenna port corresponding to a synchronization signal corresponding to the receive beam. That is, the receive beam corresponding to the physical signal may indicate whether the first antenna port and the second antenna port configured to the physical signal are QCL.

The physical signal corresponding to the receive beam may be that the beam index associated with the physical signal corresponds to a predetermined beam. Here, the predetermined beam may be included in a predetermined beam pair.

The correspondence relationship between the control channel and the receive beam will be described below.

Figure 8:
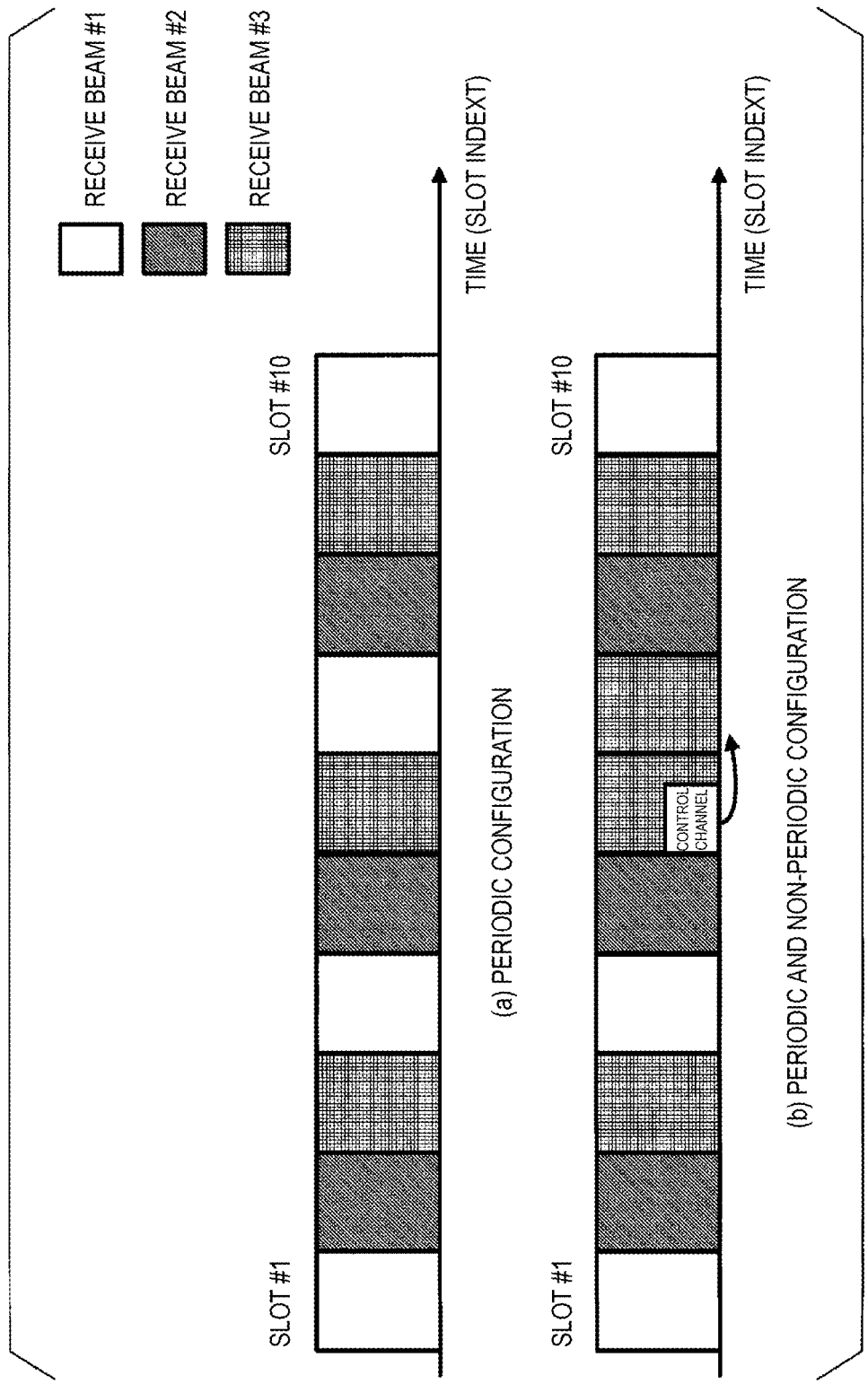
FIG. 8 is a diagram illustrating an example of a correspondence relationship between a physical signal included in a slot and a receive beam according to the aspect of the present embodiment.

FIG. 8 is a diagram illustrating an example of a correspondence relationship between a physical signal included in a slot and a receive beam according to the aspect of the present embodiment. In FIG. 8, the physical signal included in slots indicated by blocks without a pattern corresponds to receive beam #1. The physical signal included in slots indicated by blocks of a hatched pattern corresponds to receive beam #2. The physical signal included in slots indicated by blocks of a grid pattern corresponds to receive beam #3. That is, the receive beam corresponding to the physical signal may be given in slot units. The receive beam corresponding to the physical signal may vary from slot to slot.

Part (a) of FIG. 8 is an example in which a pattern of receive beams corresponding to physical signals included in the slots is periodic. Part (b) of FIG. 8 is an example in which a pattern of receive beams corresponding to physical signals included in the slots is aperiodic. In part (b) of FIG. 8, based on the control channel included in slot #6, the receive beam corresponding to the physical signal included in slot #7 switches from receive beam #1 to receive beam #2. Thus, the pattern of the receive beams corresponding to the physical signals included in the slots may be given periodically or aperiodically.

A first receive beam corresponding to a first physical signal included in the predetermined period and a second receive beam corresponding to a second physical signal included in the predetermined period may be the same. The predetermined period may be given by one or a plurality of slots. For example, the predetermined period may be one slot, two slots, three slots, or 10 slots. The predetermined period may be given by one or a plurality of OFDM symbols. For example, the predetermined period may be one OFDM symbol, two OFDM symbols, three OFDM symbols, seven OFDM symbols, or 14 OFDM symbols.

The predetermined period may indicate a range in which the control resource set is mapped to the resource elements. The predetermined period may indicate a range in which the CSS is mapped to the resource elements. The predetermined period may indicate a range in which the USS is mapped to the resource elements.

The receive beam corresponding to the physical signal generated at the predetermined period may be given based at least on the type (kind) of the physical signal. The first receive beam corresponding to the first physical signal generated at the predetermined period and the second receive beam corresponding to the first physical signal may be different from each other or may be the same.

The receive beam corresponding to the physical signal generated at the predetermined period may be given based on specifications and the like. The receive beam corresponding to the physical signal generated at the predetermined period may be given based at least on the higher layer signaling (MIB, SIB, common RRC signaling, dedicated RRC signaling, MAC layer signal, etc.). The higher layer signaling may include some or all of MIB, SIB, common RRC signaling, dedicated RRC signaling, and MAC layer signal. The receive beam corresponding to the physical signal generated at the predetermined period may be given based on at least the downlink control information. That is, methods by which the first receive beam corresponding to the first physical signal and the second receive beam corresponding to the second physical signal generated at the predetermined period are given may be different from each other. For example, the first receive beam corresponding to the control channel generated at the predetermined period may be given based at least on the higher layer signaling, and the second receive beam corresponding to the reference signal generated at the predetermined period may be given based at least on the downlink control information. Here, the MAC layer signal may be Midium Access Control Control Element (MAC CE).

The receive beam corresponding to the physical signal generated at the predetermined period may be a receive beam corresponding to a channel of a physical layer including information indicating transmission of the physical signal (information related to a resource allocation of the physical signal, an index used for coding, a grant, etc.). For example, the receive beam corresponding to the broadcast channel generated at the predetermined period may be a receive beam corresponding to a physical signal (e.g., PSS, or SSS, etc.) that includes information indicating transmission of the broadcast channel. The receive beam corresponding to the shared channel generated at the predetermined period may be a receive beam corresponding to a control channel including information (grant) indicating transmission of the shared channel.

The second physical signal may correspond to the first receive beam in a case that the first receive beam corresponds to the first physical signal generated at a predetermined period (or the first period) and the second physical signal is generated at the predetermined period. The second physical signal may correspond to the second receive beam in a case that the first receive beam corresponds to the first physical signal generated at a predetermined period (or the first period) and the second physical signal is generated at the second period. Note that the first physical signal generated at the second period may correspond to the first receive beam. Here, the first period and the second period may be individually defined periods. The first period and the second period may be configured individually. That is, the first period and the second period may be individual parameters.

The first physical signal may include at least some or all of a synchronization signal, a reference signal, or a channel of a physical layer. The second physical signal may include at least one of a synchronization signal, a reference signal, and a channel of a physical layer. For example, the first physical signal may include a control channel and the second physical signal may include a CSI-RS. The first physical signal may include a control channel and the second physical signal may include a shared channel. The first physical signal may include a synchronization signal and the second physical signal may include a control channel. The first physical signal may include a synchronization signal and the second physical signal may include a control channel. The first physical signal and the second physical signal may be physical signals of the same type. That is, even with the physical signals of the same type, a priority order may be provided for the receive beam or beam pair. Note that the combinations of the first physical signal and the second physical signal are not limited to the above.

The first physical signal may correspond to the first receive beam in a case that the transmission of the first physical signal generated at the predetermined period is indicated by the first PDCCH. The first physical signal may correspond to the second receive beam in a case that the transmission of the first physical signal generated at the predetermined period is indicated by the second PDCCH. Here, the first PDCCH may be a PDCCH added with a Cyclic Redundancy Check (CRC) sequence masked by the first Radio Network Temporary Identifier (RNTI). The second PDCCH may be a PDCCH added with a CRC sequence masked with the second RNTI. The first PDCCH may also correspond to the first receive beam. The second PDCCH may also correspond to the second receive beam. The first PDCCH may or may not be detected at the predetermined period. The second PDCCH may or may not be detected at the predetermined period. Whether or not the first PDCCH corresponds to the first receive beam may be given based on at least some or all of the higher layer signaling and the downlink control information. Whether or not the second PDCCH corresponds to the second receive beam may be given based on at least some or all of the higher layer signaling and the downlink control information. Whether or not the PDCCH and the physical signal correspond to the same receive beam may be given based on at least some or all of the higher layer signaling and the downlink control information.

The first RNTI may be a Cell specific-RNTI (C-RNTI). The second RNTI may be a Semi Persistent Scheduling C-RNTI (SPS C-RNTI).

The first RNTI may be a C-RNTI. The second RNTI may be a Ramdom Access-RNTI (RA-RNTI). Here, in a case that the second RNTI is a RA-RNTI, the second receive beam may correspond to the third PDCCH (PDCCH order) that triggers transmission of PRACH associated with the second PDCCH. Here, the PDCCH order may include a function of triggering transmission of the random access channel. The PDCCH order may include at least a field indicating an index of the random access channel. The PDCCH order may include at least information related to an index of the random access preamble transmitted in the random access channel.

The first receive beam may be rephrased by the first antenna port. The second receive beam may be rephrased by the second antenna port. Here, the first antenna port may correspond to the first receive beam. The second antenna port may correspond to the second receive beam.

The first receive beam may be rephrased by the first transmit beam. The second receive beam may be rephrased by the second transmit beam. Here, the first receive beam and the first transmit beam may form a first beam pair. The second physical signal may also correspond to the second receive beam. The second receive beam and the second transmit beam may also form a second beam pair.

The first receive beam may be rephrased by the first beam pair. The second receive beam may be rephrased by the second beam pair. Here, the first physical signal may correspond to the first receive beam. The second physical signal may correspond to the second receive beam. The first beam pair may include at least the first receive beam. The second beam pair may include at least the second receive beam.

The first receive beam corresponding to the first physical signal may be that the first antenna port corresponding to the first physical signal and the second antenna port are QCL. The second receive beam corresponding to the second physical signal may be that the third antenna port corresponding to the second physical signal and the fourth antenna port are QCL. The first receive beam corresponding to the second physical signal may be that the third antenna port corresponding to the second physical signal and the second antenna port are QCL.

The first receive beam may be rephrased by the first beam index. The second receive beam may be rephrased by the second beam index.

In a case that the first receive beam corresponds to the first physical signal generated at a predetermined period (or the first period) and the second physical signal is generated at the predetermined period, whether the second physical signal corresponds to the first receive beam or the second receive beam may be given based at least on the functional information transmitted from the terminal apparatus 1. Here, the functional information is information indicating whether or not the terminal apparatus 1 includes a predetermined function. The functional information is transmitted from the terminal apparatus 1 to the base station apparatus 3. The transmission of the functional information may be performed based on RRC signaling. The functional information may be information indicating whether or not the function of switching the receive beam at a predetermined period is provided.

The functional information may be information indicating whether the second physical signal corresponds to the first receive beam or the second receive beam, in a case that the first receive beam corresponds to the first physical signal generated at a predetermined period (or the first period) and the second physical signal is generated at the predetermined period.

An apparatus configuration of the terminal apparatus 1 according to the present embodiment will be described below.

Figure 9:
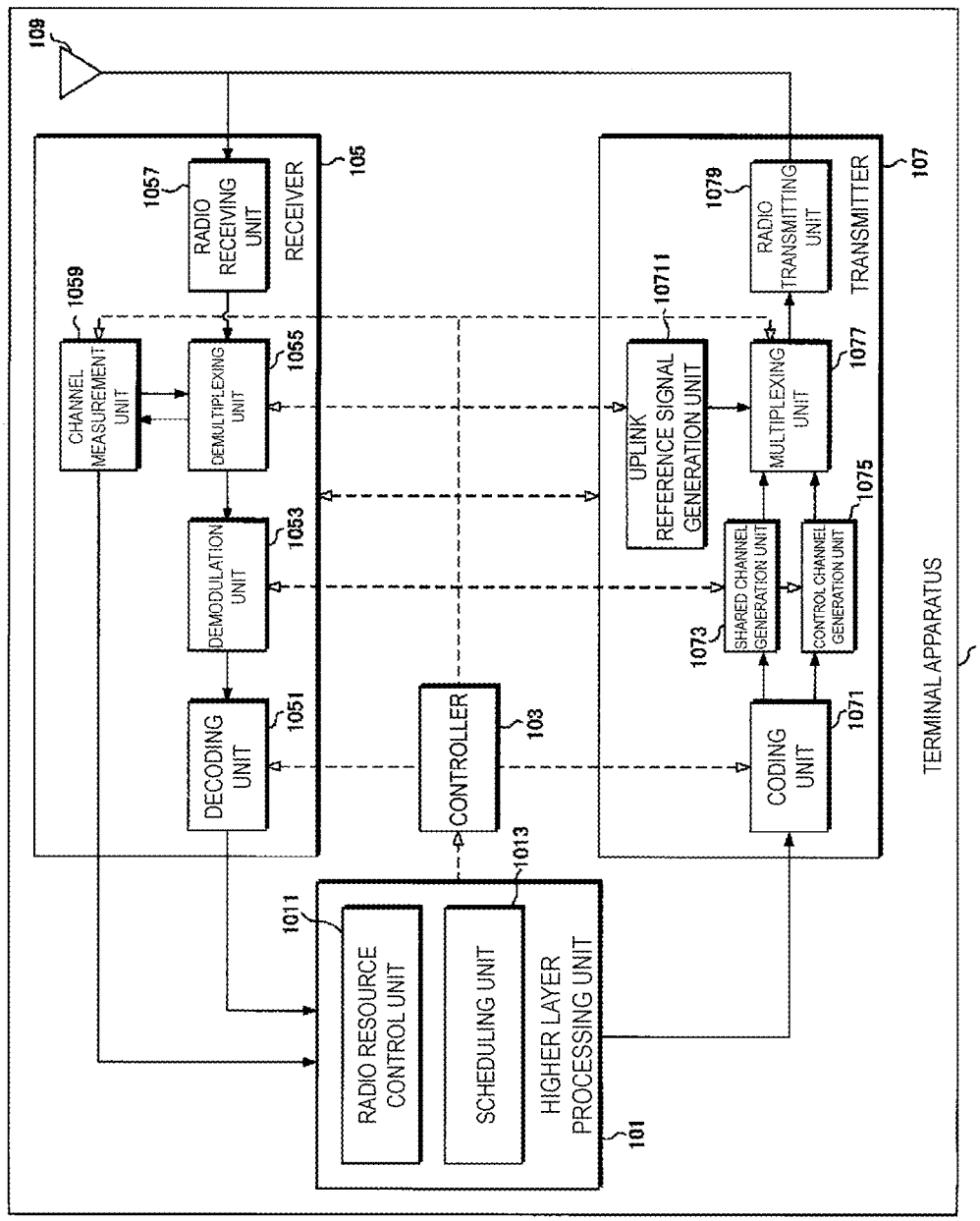
FIG. 9 is a schematic block diagram illustrating a configuration example of the terminal apparatus 1 according to the aspect of the present embodiment.

FIG. 9 is a schematic block diagram illustrating a configuration example of the terminal apparatus 1 according to the aspect of the present embodiment. As illustrated in the diagram, the terminal apparatus 1 is configured to include at least one of a higher layer processing unit 101, a controller 103, a receiver 105, a transmitter 107, and a transmit and/or receive antenna 109. The higher layer processing unit 101 is configured to include at least one of a radio resource control unit 1011 and a scheduling unit 1013. The receiver 105 is configured to include at least one of a decoding unit 1051, a demodulation unit 1053, a demultiplexing unit 1055, a radio receiving unit 1057, and a channel measurement unit 1059. The transmitter 107 is configured to include at least one of a coding unit 1071, a shared channel generation unit 1073, a control channel generation unit 1075, a multiplexing unit 1077, a radio transmitting unit 1079, and an uplink reference signal generation unit 10711.

The higher layer processing unit 101 outputs uplink data generated by a user operation or the like, to the transmitter 107. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates control information for control of the receiver 105 and the transmitter 107 based on the downlink control information or the like received by the control channel, and outputs the generated control information to the controller 103. Note that part of the processing of the medium access control layer may be performed in the controller 103.

The radio resource control unit 1011 included in the higher layer processing unit 101 manages various pieces of configuration information of the terminal apparatus 1 itself. Each of the configuration information may include configuration related to radio resource control, configuration related to RRM measurement/report, CSI measurement/report, configuration related to transmit power control, configuration related to physical channel/physical signal, configuration related to cell or beam. The configuration information may be information provided by the base station apparatus 3 and configured. Furthermore, the radio resource control unit 1011 generates information to be mapped to each uplink channel, and outputs the generated information to the transmitter 107.

The scheduling unit 1013 stores the downlink control information received through the receiver 105. The scheduling unit 1013 controls the transmitter 107 via the controller 103 so as to transmit the shared channel in accordance with a received uplink grant. The scheduling unit 1013 controls the receiver 105 via the controller 103 so as to receive the shared channel, in the subframe in which a downlink grant is received, in accordance with the received downlink grant. Here, the grant may be information indicating a resource allocated to the shared channel.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

The controller 103 may include a function of performing part of the processing of the medium access control layer (e.g., a retransmission indication, or the like). The controller 103 may be a function included in the higher layer processing unit 101.

In accordance with the control signal input from the controller 103, the receiver 105 demultiplexes, demodulates, and decodes a reception signal received from the base station apparatus 3 through the transmit and/or receive antenna 109, and outputs the resulting information from the decoding to the higher layer processing unit 101.

The radio receiving unit 1057 demodulates a downlink signal received through the transmit and/or receive antenna 109, and converts the demodulated analog signal to a digital signal. For example, the radio receiving unit 1057 may perform Fast Fourier Transform (FFT) on the digital signal, and extract a signal in the frequency domain. The radio receiving unit 1057 may apply a receive beam that performs phase transformation processing to the signal received via the transmit and/or receive antenna 109. The radio receiving unit 1057 may apply the receive beam to the signal in a case that a predetermined receive beam corresponding to the physical signal included in the signal corresponds. A correspondence relationship between the physical signal included in the signal and the predetermined receive beam may be indicated by the controller 103.

The demultiplexing unit 1055 demultiplexes the extracted signal into the control channel (or the control resource set), the shared channel, and the reference signal. The demultiplexing unit 1055 outputs the reference signal resulting from the demultiplexing, to the channel measurement unit 1059 and/or the demultiplexing unit 1055.

The demultiplexing unit 1055 performs Channel Equalization of the control channel and/or the shared channel. The control channel and/or the shared channel after the channel equalization is output to the demodulation unit 1053. The demultiplexing unit 1055 may apply a receive beam to the control channel and/or the shared channel. The demultiplexing unit 1055 may apply a predetermined receive beam to the control channel and/or the shared channel in a case that a predetermined receive beam corresponding to the control channel and/or the shared channel corresponds. A correspondence relationship between the control channel and/or the shared channel and the predetermined receive beam may be indicated by the controller 103.

The channel measurement unit 1059 performs channel measurement based on a synchronization signal and/or a reference signal. The channel measurement value given based on the channel measurement is output to the demultiplexing unit 1055.

The demodulation unit 1053 demodulates the control channel and/or the shared channel in accordance with a modulation scheme such as BPSK, QPSK, 16 QAM, 64 QAM, and the like, and outputs the result of the demodulation to the decoding unit 1051.

The decoding unit 1051 decodes the downlink data, and outputs, to the higher layer processing unit 101, the downlink data resulting from the decoding.

The transmitter 107 generates an uplink reference signal in accordance with the control signal input from the controller 103, codes and modulates the uplink data and uplink control information input from the higher layer processing unit 101, multiplexes the shared channel, the control channel, and the reference signal, and transmits a result of the multiplexing to the base station apparatus 3 through the transmit and/or receive antenna 109.

The coding unit 1071 codes the control information and the uplink data input from the higher layer processing unit 101 to generate coded bits, and outputs the coded bits to the shared channel generation unit 1073 and/or the control channel generation unit 1075.

The shared channel generation unit 1073 may modulate the coded bits input from the coding unit 1071 to generate a modulation symbol, generate the shared channel by performing at least DFT on the modulation symbol, and output the generated channel to the multiplexing unit 1077. The shared channel generation unit 1073 may modulate the coded bits input from the coding unit 1071 to generate the shared channel, and output the generated channel to the multiplexing unit 1077.

The control channel generation unit 1075 generates the control channel based on the coded bits input from the coding unit 1071 and/or the scheduling request, and outputs the generated channel to the multiplexing unit 1077.

The uplink reference signal generation unit 10711 generates the uplink reference signal, and outputs the generated uplink reference signal to the multiplexing unit 1077.

The multiplexing unit 1077 multiplexes the signal input from the shared channel generation unit 1073 and/or the signal input from the control channel generation unit 1075 and/or the uplink reference signal input from the uplink reference signal generation unit 10711, in accordance with the control signal input from the controller 103, on the uplink resource for each transmit antenna port. The multiplexing unit 1077 outputs the multiplexed signal to the radio transmitting unit 1079.

The radio transmitting unit 1079 performs Inverse Fast Fourier Transform (IFFT) on the signal resulting from the multiplexing, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

An apparatus configuration of the base station apparatus 3 according to the present embodiment will be described below.

Figure 10:
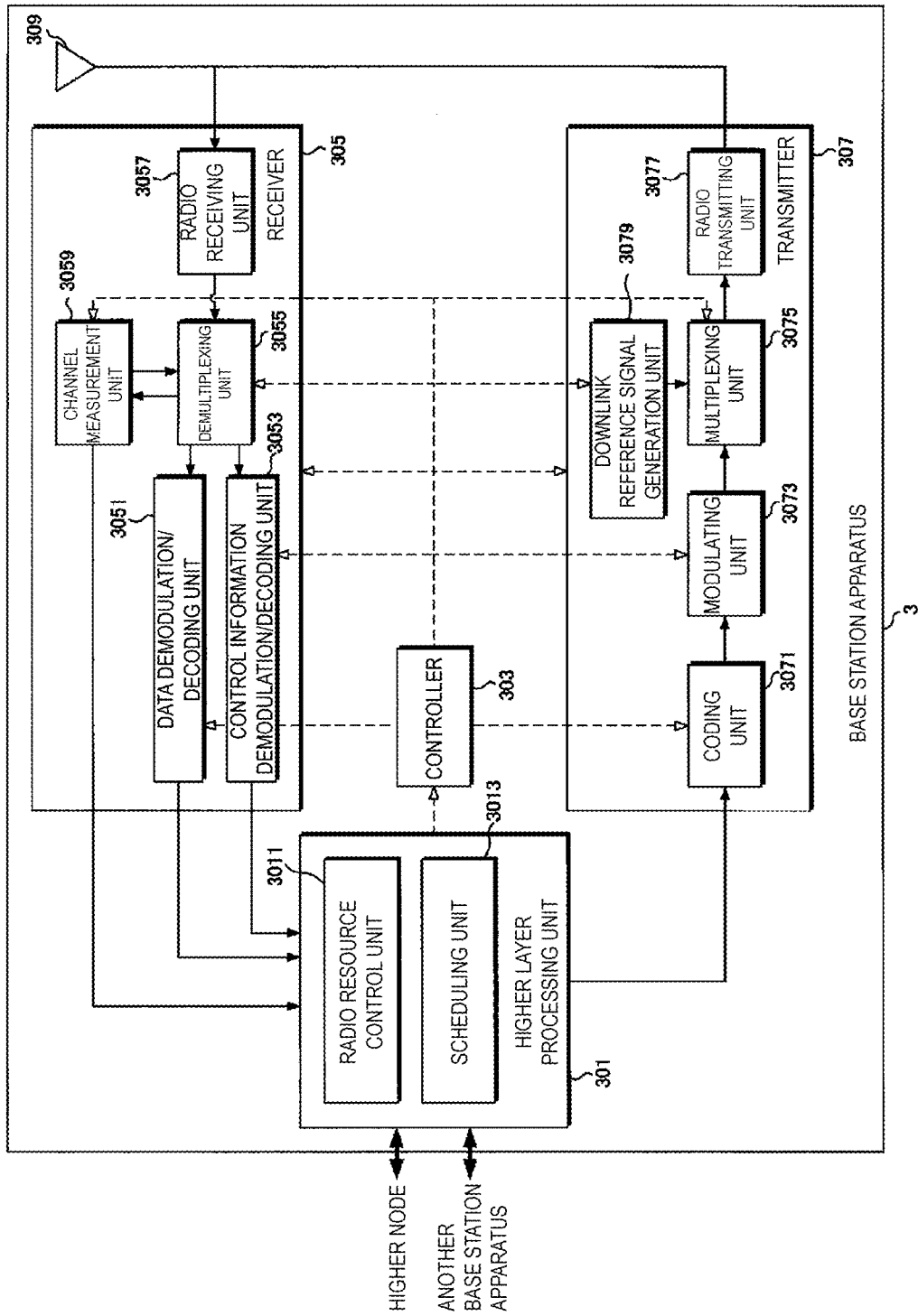
FIG. 10 is a schematic block diagram illustrating a configuration example of the base station apparatus 3 according to the aspect of the present embodiment.

FIG. 10 is a schematic block diagram illustrating a configuration example of the base station apparatus 3 according to the aspect of the present embodiment. As is illustrated, the base station apparatus 3 is configured to include at least one of a higher layer processing unit 301, a controller 303, a receiver 305, a transmitter 307, and a transmit and/or receive antenna 309. Additionally, the higher layer processing unit 301 is configured to include at least one of a radio resource control unit 3011 and a scheduling unit 3013. Additionally, the receiver 305 is configured to include at least one of a data demodulation/decoding unit 3051, a control information demodulation/decoding unit 3053, a demultiplexing unit 3055, a radio receiving unit 3057, and a channel measurement unit 3059. Additionally, the transmitter 307 is configured to include at least one of a coding unit 3071, a modulating unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303. Note that part of the processing of the medium access control layer may be performed in the controller 303.

The radio resource control unit 3011 included in the higher layer processing unit 301 can generate, or acquire from a higher node, the downlink data mapped to the downlink shared channel, the RRC signaling, and an MAC Control Element (MAC CE), and output the result of the generation or the acquirement to the scheduling unit 3013 or the controller 303. Furthermore, the radio resource control unit 3011 manages various configuration information for each of the terminal apparatuses 1.

The scheduling unit 3013 included in the higher layer processing unit 301 manages radio resources of the shared channel and the control channel allocated to the terminal apparatus 1. In a case that the radio resource of the shared channel is allocated to the terminal apparatus 1, the scheduling unit 3013 generates the uplink grant indicating the allocation of the radio resource of the shared channel, and outputs the generated uplink grant to the transmitter 307.

Based on the control information originating from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

The controller 303 may include a function of performing part of the processing of the medium access control layer (e.g., a retransmission indication, or the like).

In accordance with the control signal input from the controller 303, the receiver 305 demultiplexes, demodulates, and decodes the reception signal received from the terminal apparatus 1 through the transmit and/or receive antenna 309, and outputs information resulting from the decoding to the higher layer processing unit 301.

The radio receiving unit 3057 performs orthogonal demodulation on the uplink signal received through the transmit and/or receive antenna 309, and converts the orthogonally-demodulated analog signal to a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 3055 demultiplexes the signal input from the radio receiving unit 3057 into the control channel, the shared channel, and the signal such as the reference signal. The demultiplexing may be performed based on radio resource allocation information that is determined in advance by the base station apparatus 3 using the radio resource control unit 3011 and that is included in the uplink grant each of which is notified to the terminal apparatuses 1. The demultiplexing unit 3055 makes a compensation of channels including the control channel and the shared channel from a channel estimate input from the channel measurement unit 3059. Furthermore, the demultiplexing unit 3055 outputs the reference signal resulting from the demultiplexing, to the channel measurement unit 3059.

The demultiplexing unit 3055 acquires a modulation symbol including the uplink data and a modulation symbol including the uplink control information from the demultiplexed control channel and shared channel. The demultiplexing unit 3055 outputs the modulation symbol including the uplink data acquired from the signal of the shared channel to the data demodulation/decoding unit 3051. The demultiplexing unit 3055 outputs the modulation symbol including the uplink control information acquired from the control channel or the shared channel to the control information demodulation/decoding unit 3053.

The channel measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The data demodulation/decoding unit 3051 decodes the uplink data from the modulation symbol of the uplink data input from the demultiplexing unit 3055. The data demodulation/decoding unit 3051 outputs the decoded uplink data to the higher layer processing unit 301.

The control information demodulation/decoding unit 3053 decodes HARQ-ACK from the modulation symbol including the uplink control information input from the demultiplexing unit 3055. The control information demodulation/decoding unit 3053 can output the decoded uplink control information to the higher layer processing unit 301 or the controller 303.

The transmitter 307 generates the downlink reference signal in accordance with the control signal input from the controller 303, codes and modulates the downlink control information and the downlink data input from the higher layer processing unit 301, includes some or all of the control channel, the control resource set, the shared channel, and the reference signal, and transmits the signal to the terminal apparatus 1 through the transmit and/or receive antenna 309. The transmitter 307 may apply a transmit beam to some or all of the control channel, the control resource set, the shared channel, and the reference signal.

The coding unit 3071 performs coding on the downlink control information and the downlink data input from the higher layer processing unit 301. The modulating unit 3073 modulates the coded bits input from the coding unit 3071, in compliance with the modulation scheme such as BPSK, QPSK, 16 QAM, or 64 QAM. The modulating unit 3073 may apply transmission precoding to the modulation symbol. The transmission precoding may include transmission pre-code. Note that the transmission precoding may be multiplication (application) of the transmission precoder. The transmission precoder may be the DFT (or may be the DFT diffusion).

The downlink reference signal generation unit 3079 generates the downlink reference signal. The multiplexing unit 3075 multiplexes the modulation symbol of each channel and the downlink reference signal to generate the transmission symbol.

The multiplexing unit 3075 may apply a precoder to the transmission symbol. The precoder applied to the transmission symbol by the multiplexing unit 3075 may be applied to the downlink reference signal and/or the modulation symbol. Additionally, the precoder applied to the downlink reference signal and the precoder applied to the modulation symbol may be the same or different.

The precoder is one method of forming a beam. The precoder is an operator (vector) that provides, for each transmit antenna, a phase rotation applied to the transmission symbol transmitted from one or a plurality of transmit antennas. In a Spatial Division Multiplex (SDM) in which a plurality of transmission symbols is multiplexed at the same time/frequency, since at least one vector is given for the plurality of transmission symbols, the precoder may be expressed by a matrix.

The radio transmitting unit 3077 generates a time symbol by performing Inverse Fast Fourier Transform (IFFT) on the multiplexed transmission symbol and the like. The radio transmitting unit 3077 performs the modulation in compliance with an OFDM scheme on the time symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, and generates a Carrier signal (Carrier, RF signal, or the like). The radio transmitting unit 3077 performs power amplification on the carrier signal, and outputs the final result to the transmit and/or receive antenna 309 for transmission. The radio transmitting unit 3077 may apply a transmit beam to the carrier signal.

Aspects of various apparatuses according to the aspect of the present embodiment will be described below.

(1) To accomplish the object described above, aspects of the present invention are contrived to provide the following measures. Specifically, a first aspect of the present invention is a terminal apparatus including: a receiver configured to receive at least a first physical signal and/or a second physical signal, wherein the first physical signal is generated during a first period, the first physical signal corresponds to a first beam during the first period, the second physical signal corresponds to the first beam in a case that the second physical signal is generated during the first period, and the second physical signal corresponds to a second beam in a case that the second physical signal is generated during a second period.

(2) In the first aspect of the present invention, the first period is a unit (slot) by which a transport block is mapped.

(3) A second aspect of the present invention is a terminal apparatus including: a decoding unit configured to decode a PDCCH; and a receiver configured to receive a PDSCH at least based on the PDCCH, wherein the PDSCH is generated in a first slot, and in a case that the PDCCH is a first PDCCH to which the CRC sequence to be masked based on a first RNTI is added, the PDSCH corresponds to a first beam, and in a case that the PDCCH is a second PDCCH to which a CRC sequence to be masked based on a second RNTI is added, the PDSCH corresponds to a second beam.

(4) In the second aspect of the present invention, the first beam corresponds to the first PDCCH or is indicated by the first PDCCH.

(5) A third aspect of the present invention is a base station apparatus including: a transmitter configured to transmit at least a first physical signal and/or a second physical signal, wherein the first physical signal is transmitted during a first period, the first physical signal corresponds to a first beam during the first period, the second physical signal corresponds to the first beam in a case that the second physical signal is transmitted during the first period, and the second physical signal corresponds to a second beam in a case that the second physical signal is transmitted during a second period.

(6) In the third aspect of the present invention, the first period is a unit (slot) by which a transport block is mapped.

(7) A fourth aspect of the present invention is a base station apparatus including: a coding unit configured to code a PDCCH and a PDSCH; and a transmitter configured to transmit the PDCCH and the PDSCH, wherein the PDCCH includes allocation information of the PDSCH, the PDSCH is transmitted in a first slot, and in a case that the PDCCH is a first PDCCH to which the CRC sequence to be masked based on a first RNTI is added, the PDSCH corresponds to a first beam corresponding to the first slot, and in a case that the PDCCH is a second PDCCH to which a CRC sequence to be masked based on a second RNTI is added, the PDSCH corresponds to a second beam.

(8) In the fourth aspect of the present invention, the first beam corresponds to the first PDCCH or is indicated by the first PDCCH.

Each of programs running on a base station apparatus 3 and a terminal apparatus 1 according to the aspect of the present invention may be a program that controls a Central Processing Unit (CPU) and the like, such that the program causes a computer to operate in such a manner as to realize the functions of the above-described embodiment according to the aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) including multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
101, 301 Higher layer processing unit
103, 303 Controller
105, 305 Receiver
107, 307 Transmitter
109, 309 Transmit and/or receive antenna
1011, 3011 Radio resource control unit
1013, 3013 Scheduling unit
1051 Decoding unit
1053 Demodulation unit
1055, 3055 Demultiplexing unit
1057, 3057 Radio receiving unit
1059, 3059 Channel measurement unit
1071, 3071 Coding unit
1073 Shared channel generation unit
1075 Control channel generation unit
1077, 3075 Multiplexing unit
1079, 3077 Radio transmitting unit
10711 Uplink reference signal generation unit
3051 Data demodulation/decoding unit
3053 Control information demodulation/decoding unit
3073 Modulating unit
3079 Downlink reference signal generation unit

The invention claimed is:

1. A terminal device comprising:
reception circuitry configured and/or programmed to monitor a control channel, wherein an antenna port of the control channel has a quasi co-location relationship with an antenna port of a first channel state-information-reference signal (CSI-RS); and
decoding circuitry configured and/or programmed to decode a shared channel based on the control channel; wherein
in a case that the control channel is received on a first duration and the shared channel is received on a second duration that is different from the first duration, an antenna port of the shared channel has a quasi co-location with an antenna port of a second channel state information-reference signal; and
in a case that the control channel and the shared channel are received on the same duration, the antenna port of the shared channel has a quasi co-location relationship with the antenna port of the first channel information-reference signal, wherein a duration refers to one or a plurality of slots, or one or a plurality of OFDM symbols in time domain;
wherein a length of an OFDM symbol is based on a number of points in Fast Fourier Transform (FFT) used to generate the OFDM symbol, and the length of the OFDM symbol includes a Cyclic Prefix (CP) length added to the OFDM symbol.

2. A communication method performed by a terminal device, the communication method comprising:
monitoring a control channel, wherein an antenna port of the control channel has a quasi co-location relationship with an antenna port of a first channel state-information-reference signal (CSI-RS); and
decoding a shared channel based on the control channel; wherein
in a case that the control channel is received on a first duration and the shared channel is received on a second duration that is different from the first duration, an antenna port of the shared channel has a quasi co-location with an antenna port of a second channel state information-reference signal; and
in a case that the control channel and the shared channel are received on the same duration, the antenna port of the shared channel has a quasi co-location relationship with the antenna port of the first channel information-reference signal, wherein a duration refers to one or a plurality of slots, or one or a plurality of OFDM symbols in time domain;

wherein a length of an OFDM symbol is based on a number of points in Fast Fourier Transform (FFT) used to generate the OFDM symbol, and the length of the OFDM symbol includes a Cyclic Prefix (CP) length added to the OFDM symbol.

* * * * *